(12) United States Patent
Suzuki et al.

(10) Patent No.: US 7,975,822 B2
(45) Date of Patent: Jul. 12, 2011

(54) MULTI-PLATE FRICTIONAL ENGAGEMENT APPARATUS

(75) Inventors: Masato Suzuki, Toyota (JP); Takuya Muranaka, Aichi-gun (JP); Hirofumi Onishi, Aichi-gun (JP)

(73) Assignees: Aisin Kako Kabushiki Kaisha, Toyota-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 759 days.

(21) Appl. No.: 11/950,000

(22) Filed: Dec. 4, 2007

(65) Prior Publication Data

US 2008/0128236 A1    Jun. 5, 2008

(30) Foreign Application Priority Data

Dec. 5, 2006 (JP) ................................. 2006-327816

(51) Int. Cl.
 *F16D 13/72* (2006.01)
 *F16D 69/00* (2006.01)
(52) U.S. Cl. .................................. 192/70.12; 192/70.14
(58) Field of Classification Search ................. 192/70.14
 See application file for complete search history.

(56) References Cited

U.S. PATENT DOCUMENTS

| 5,535,870 | A |  | 7/1996 | Takezaki et al. |  |
|---|---|---|---|---|---|
| 5,913,395 | A | * | 6/1999 | Takakura et al. | 192/70.12 |
| 6,899,783 | B2 | * | 5/2005 | Oguri et al. | 192/70.12 |
| 7,059,459 | B2 | * | 6/2006 | Miyoshi | 192/70.12 |
| 2005/0205373 | A1 | * | 9/2005 | Foster et al. | 192/70.12 |
| 2007/0193847 | A1 | * | 8/2007 | Keating et al. | 192/107 R |

FOREIGN PATENT DOCUMENTS

| JP | 06-294420 A | 10/1994 |
|---|---|---|
| JP | 8-326776 A | 12/1996 |
| JP | 10-078051 A | 3/1998 |
| JP | 10-169681 A | 6/1998 |

* cited by examiner

*Primary Examiner* — Rodney H Bonck
(74) *Attorney, Agent, or Firm* — Buchanan Ingersoll & Rooney PC

(57) ABSTRACT

Three external tooth wet friction materials are each composed of an external tooth plate and a lining adhered to one surface thereof along an entire circumference. Three internal tooth wet friction materials are each composed of an internal tooth plate and a lining adhered to one surface thereof along an entire circumference. Then, the three external tooth wet friction materials and the three internal tooth wet friction materials are disposed side by side so as to constitute a multi-plate frictional engagement apparatus. A thickness of the internal tooth plate is made thinner in view of its good heat discharge capability, and the thickness of the external tooth plate is made thicker by that much.

8 Claims, 2 Drawing Sheets

MULTI-PLATE FRICTIONAL ENGAGEMENT APPARATUS

BACKGROUND OF THE INVENTION

1. Field of the Invention

This invention relates to a multi-plate frictional engagement apparatus that obtains a torque by applying a high pressure to an opposed surface of a wet clutch, a brake friction material, lock-up clutch or the like, while immersing it in an oil, in an automatic transmission (may be referred to as "AT" hereafter) of an automobile or the like. Particularly, this invention relates to a multi-plate frictional engagement apparatus capable of improving heat resistance without increase of a pack amount (axial length).

2. Description of the Related Art

In recent years, it is requested to improve heat resistance more in a multi-plate frictional engagement apparatus such as a wet clutch, a wet brake or the like used in an automatic transmission or the like. If enlarging a thickness of a metal plate, which has a frictional surface adhered with a wet friction material, a temperature on the frictional surface is lowered by heat absorption by the metal plate and the heat resistance is improved. However, the multi-plate frictional engagement apparatus occupies more space (pack amount) by that much and it goes against a request for downsizing or reducing the space of the automatic transmission or the like.

In view of that fact, a first patent publication (Japanese Laid Open Patent Publication No. H8-326776) discloses a technique for a multi-plate frictional engagement apparatus. In the apparatus, a wet frictional material as a heat insulator is not attached to an external tooth plate at a nearest side to a piston. On the other hand, the wet frictional materials are attached to opposite surfaces of an internal tooth plate at a nearest side to the piston. Thereby, a heat is released from a back surface of the external tooth plate at the nearest side to the piston, thereby increasing a heat capacity so as to improve a heat resistance of the multi-plate frictional engagement apparatus.

A second patent publication (Japanese laid Open Patent Publication No. H10-78051) discloses another technique for a frictional engagement apparatus. The apparatus is a single face frictional engagement apparatus in which wet friction materials are adhere to just one surface of each of all external tooth plates and all internal tooth plates. In the apparatus, there may be a problem that a temperature of part of the external tooth plate or the internal tooth plate rapidly rises due to an eccentric frictional engagement such as an inner side contact or an outer side contact. In such case, the external tooth plate and the internal tooth plate are thermally distorted. Therefore, in order to prevent such problem, notches are provided along an overall inner circumference of the external tooth plate and an overall outer circumference of the internal tooth plate so as to reduce the thermal distortion.

A third patent publication (Japanese Laid Open Patent Publication No. H10-169681) discloses still another technique for a frictional engagement apparatus. The apparatus is also a single face frictional engagement apparatus. The apparatus has a friction material fixed on an external tooth plate, while forming grooves on the function material so as to be inclined along a rotational direction of the external tooth plate. Moreover, the apparatus has a friction material fixed on an internal tooth plate, while forming grooves on the friction material so as not to be inclined. Consequently, oil is hard to be discharged from a frictional surface of the external tooth plate, thereby preventing eccentric location of a disc or increase in a drag torque.

However, in the invention described in the first patent publication, the heat is released only from the back surface of the external tooth plate at the nearest side to the piston. Therefore, heat discharge is not sufficient and there is a limit in improving the heat resistance. In the invention described in the second patent publication, it is necessary to provide the notches along the overall inner circumference of the external tooth plate and the overall outer circumference of the internal tooth plate. Therefore, there may be a problem that a machining process is complicated and causes production costs to increase. Moreover, since a lining is cut by the notches, there may be another problem or adverse effect that a wear resistance of the lining is deteriorated. In the invention described in the third patent publication, the grooves need to be formed on the external tooth plate and the internal tooth plate in a different manner. Therefore, there may be similar problems as described in the second patent publication.

BRIEF SUMMARY OF THE INVENTION

An object of the present invention is to provide a multi-plate frictional engagement apparatus that increases sufficiently a heat capacity thereof without any needs to add new steps and without any deterioration of a wear resistance of a lining, thereby improving largely a heat resistance thereof.

According to a first aspect of the invention, there is provided a multi-plate frictional engagement apparatus. The multi-plate frictional engagement apparatus comprises a plurality of metal external tooth plates. A plurality of metal internal tooth plates is arranged side by side to the external tooth plates. The internal tooth plates are rotated even at a non-engagement time. Linings are adhered to only one surface of each of the external tooth plates and to only one surface of each of the internal tooth plates. The lining is cut out from a wet friction material substrate. A thickness of the internal tooth plate is set smaller than a thickness of the external tooth plate.

With the first aspect of the invention, a frictional surface at a time of engagement is constituted by a surface of the metal external tooth plate or internal tooth plate and a surface of the lining. Therefore, a frictional heat is transmitted to the external tooth plates or the internal tooth plates and then released to an outside.

At this time, the internal tooth plates are rotated at any time and has a good heat discharge through a lubricating oil. Moreover, in case a partial high surface pressure is generated when a piston is operated or by a snap ring opening part, the rotating internal tooth plates spread or disperse such positions where partial high surface pressure is generated. As a result, the internal tooth plates prevent a location from getting high temperature and refrains damage of a frictional material from occurring.

Accordingly, the internal tooth plate is superior to the external tooth plate in respect of the heat discharge. Therefore, it is possible to increase a heat capacity of the external tooth plates without enlarging a pack amount by making thinner the internal tooth plate, which is advantageous in terms of the heat discharge ability, and making thicker the external tooth plate by that much. Consequently, it improves very much a heat discharge ability of the multi-plate frictional engagement apparatus as a whole.

Thus, the multi-plate frictional engagement apparatus increases sufficiently the heat capacity thereof without any needs to add new steps and without any deterioration of a wear resistance of the lining, thereby improving largely the heat resistance thereof.

In the multi-plate frictional engagement apparatus, the thickness of the internal tooth plate may preferably be within a range of 50% to 90% of the thickness of the external tooth plate.

The inventors have made a keen study and experiments and finally found that the thickness of the internal tooth plate is preferably within a range of 50% to 90% of the thickness of the external tooth plate or, more preferably, within a range of 60% to 80% of the thickness of the external tooth plate. Then, the inventors have completed and finished the invention on the basis of such knowledge.

That is, if the thickness of the internal tooth plate is less than 50% of the thickness of the external tooth plate, strength of the internal tooth plate is lowered and it is a possible that the internal tooth plate is distorted when a load is applied from a piston. On the other hand, if the thickness of the internal tooth plate is more than 90% of the thickness of the external tooth plate, it is hard to obtain the advantageous effects of improving the heat resistance by increasing the heat capacity of the external tooth plates by enlarging the thickness of the external tooth plate. Accordingly, it is desirable that the thickness of the internal tooth plate is within the range of 50% to 90% of the thickness of the external tooth plate. Moreover, for similar reasons, it is more desirable to set the thickness of the internal tooth plate within the range of 60% to 80% of the thickness of the external tooth plate.

In the multi-plate frictional engagement apparatus, the thickness of the internal tooth plate may preferably be within a range of 0.8 mm to 2.0 mm, while the thickness of the external tooth plate being within a range of 1.0 mm to 2.4 mm.

The inventors have made a keen study and experiments and finally found that it is necessary to set the thickness of the internal tooth plate within a range of 0.8 mm to 2.0 mm, while setting the thickness of the external tooth plate within a range of 1.0 mm to 2.4 mm, in order to improve the heat resistance to a large extent. Then, the inventors have completed and finished the invention on the basis of such knowledge.

That is, if the thickness of the internal tooth plate is less than 0.8 mm, strength of the internal tooth plate is lowered and it is a possible that the internal tooth plate is distorted when a load is applied from a piston. On the other hand, if the thickness of the internal tooth plate is more than 2.0 mm, the pack amount becomes large when making the thickness of the external tooth plate larger than that value. It contradicts a request for small space. Moreover, if the thickness of the external tooth plate is less than 1.0 mm, it is hard to obtain the advantageous effects of improving the heat resistance by increasing the heat capacity of the external tooth plates by enlarging the thickness of the external tooth plate. On the other hand, the thickness of the external tooth plate is more than 2.4 mm, the pack amount becomes large. Accordingly, it is desirable that the thickness of the internal tooth plate is within the range of 0.8 mm to 2.0 mm and the thickness of the external tooth plate is within the range of 1.0 mm to 2.4 mm.

In the multi-plate frictional engagement apparatus, the thickness of the internal tooth plate may preferably be within a range of 0.8 mm to 2.0 mm, while the thickness of the internal tooth plate being set within a range of 50% to 90% of the thickness of the external tooth plate.

In the multi-plate frictional engagement apparatus, the thickness of the internal tooth plate may preferably be within a range of 0.8 mm to 2.0 mm, while the thickness of the internal tooth plate being set within a range of 60% to 80% of the thickness of the external tooth plate.

In the multi-plate frictional engagement apparatus, the thickness of the external tooth plate may preferably be within a range of 1.4 mm to 1.8 mm, while the thickness of the internal tooth plate being set within a range of about 65% to about 85% of the thickness of the external tooth plate.

In the multi-plate frictional engagement apparatus, the thickness of all the internal tooth plates may preferably be set at a same thickness, while the thickness of all the external tooth plates being set at a same thickness.

Further objects and advantages of the invention will be apparent from the following description, reference being had to the accompanying drawings, wherein preferred embodiments of the invention are clearly shown.

DETAILED DESCRIPTION OF THE INVENTION

Figure 1:
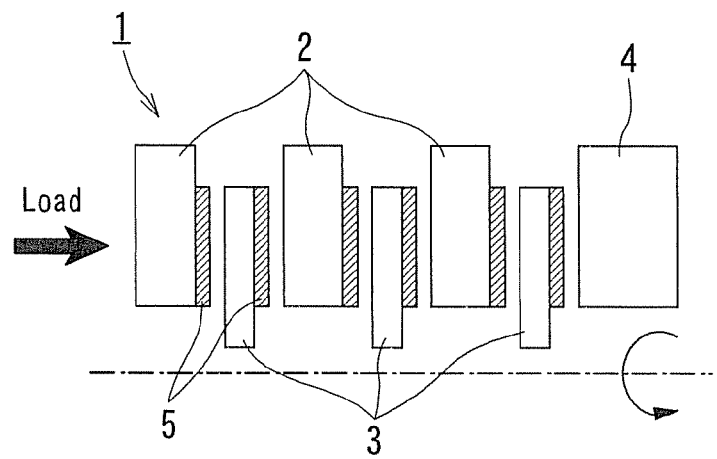
FIG. 1 is a schematic view diagrammatically showing an overall structure of a multi-plate frictional engagement apparatus according to one embodiment of the invention.
Figure 2:
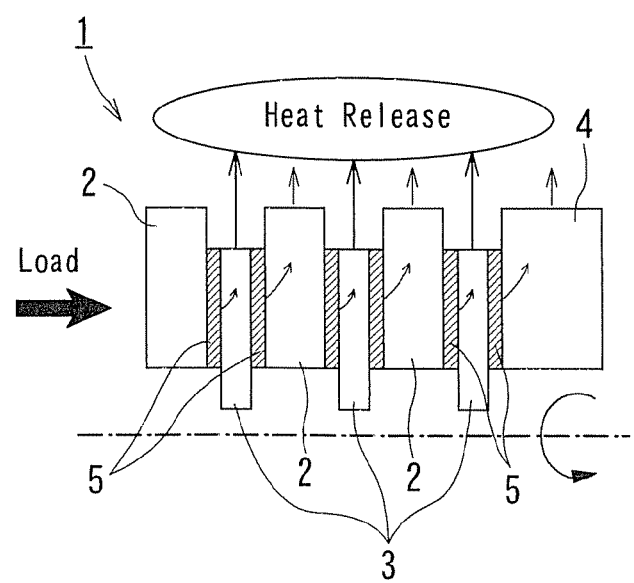
FIG. 2 is a schematic view diagrammatically showing an overall structure of the multi-plate frictional engagement apparatus in an engagement state according to the one embodiment of the invention.
Figure 3:
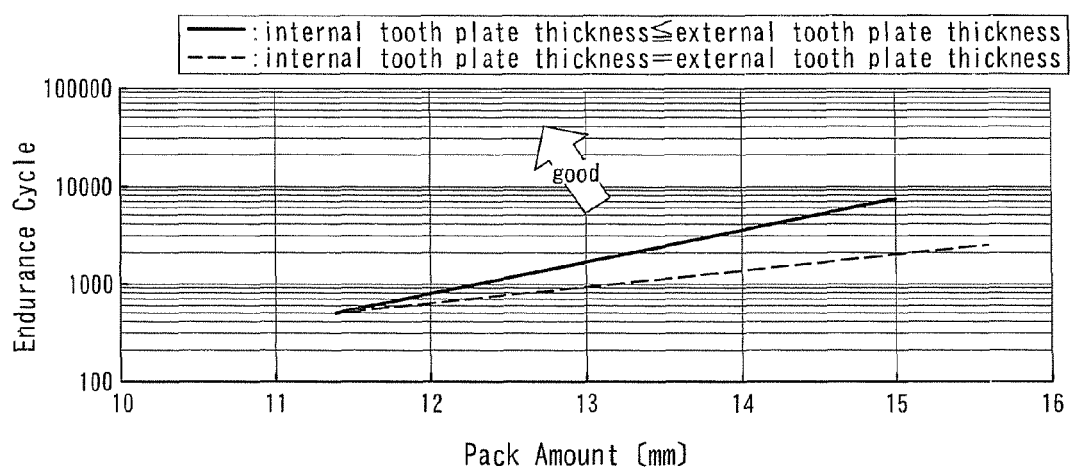
FIG. 3 is a graph showing a heat resistance of the multi-plate frictional engagement apparatus according to the one embodiment of the invention, while comparing it with a conventional multi-plate frictional engagement apparatus.

One preferred embodiment of the invention is described hereunder referring to FIG. 1 to FIG. 3. FIG. 1 is a schematic view diagrammatically showing an overall structure of a multi-plate frictional engagement apparatus according to one embodiment of the invention. FIG. 2 is a schematic view diagrammatically showing an overall structure of the multi-plate frictional engagement apparatus in an engagement state according to the one embodiment of the invention. FIG. 3 is a graph showing a heat resistance of the multi-plate frictional engagement apparatus according to the one embodiment of the invention, while comparing it with a conventional multi-plate frictional engagement apparatus.

As shown in FIG. 1, a multi-plate frictional engagement apparatus 1 according to the present embodiment has a plurality of external tooth plates 2 and a plurality of internal tooth plates 3. In FIG. 1, the apparatus is illustrated such that three external tooth plate 2 and three internal tooth plates 3 are arranged so as to be disposed one by one. A one-dot chain line in FIG. 1 shows a rotational center axis (imaginary line) of the internal tooth plates 3. The external tooth plate 2 is a core metal of a flat ring shape. The internal tooth plate 3 is also a core metal of a flat ring shape. Linings 5 are cut out of a wet friction material substrate. The lining 5 is adhered to one surface of each of the external tooth plates 2 along an entire circumference of the external tooth plate 2. The lining 5 is adhered to one surface of each of the internal tooth plates 3 along an entire circumference of the internal tooth plate 3, too. The apparatus 1 further has a flange 4 for receiving a pressure (shown by a bold arrow in FIG. 1) of a piston not shown. The apparatus 1 constitutes a wet clutch as a multi-plate frictional engagement apparatus used in an automatic transmission of an automobile.

As described above, three external tooth wet friction materials are each composed of the external tooth plate 2 and the lining 5 adhered to the one surface thereof along the entire circumference. Three internal tooth wet friction materials are each composed of the internal tooth plate 3 and the lining 5 adhered to the one surface thereof along the entire circumference. Then, the three external tooth wet friction materials and the three internal tooth wet friction materials are disposed side by side so as to constitute the present embodiment of the multi-plate frictional engagement apparatus 1.

In the multi-plate frictional engagement apparatus 1, the thickness of all of the three external tooth plates 2 is set at a same thickness, while the thickness of all of the three internal tooth plates 3 being set at a same thickness. Moreover, the thickness of the flange 4 is set larger than the thickness of the external tooth plate 2 in FIG. 1. However, the thickness of the flange is preferably set at the same thickness as the external tooth plate 2 in order to decrease a pack amount or to lessen a size of the multi-plate frictional engagement apparatus 1. Moreover, the flange 4 serves as a counterpart member to the internal tooth plate 3 at the most right side so as to constitute a frictional surface together with the lining 5 on the internal tooth plate 3. Then, the flange 4 functions to release the heat to an outside in the same way as the external tooth plate 2. Thus, the flange 4 can be deemed to a same member as the external tooth plate 2 in its functional view.

In the multi-plate frictional engagement apparatus 1 according to the present embodiment, the internal tooth plate 3 is formed to be thinner than the external tooth plate 2. The internal tooth plate 3 is normally rotated at all times and has good heat discharge by a lubricating oil. Moreover, if a local high surface pressure is generated by a notch shape of a piston at the time of operation of the piston not shown or by an opening portion of a snap ring not shown or the like, the internal tooth plate 3 disperses the local high surface pressure by rotating a position of the local high surface pressure. Thus, the internal tooth plate 2 is able to restrain a local part from being high temperature and prevent the friction material from damage.

Accordingly, the internal tooth plate 3 is advantageous or superior to the external tooth plate 2 in terms of the heat discharge. Therefore, the internal tooth plates 3 are each formed to be thinner, while the external tooth plates 2 being each formed to be thicker by that much. Thereby, a heat capacity of each of the external tooth plate 2 is enlarged without increasing a pack amount, and the heat discharge of the multi-plate frictional engagement apparatus as a whole can be improved to a large extent.

A heat release route or path of a frictional heat in the engagement state is described referring to FIG. 2. As shown in FIG. 2, the multi-plate frictional engagement apparatus 1 alternately arranges side by side the three external tooth plates 2, one surface of which the lining 5 is adhered to, and the three internal tooth plates 3, one surface of which the lining 5 is also adhered to. In the apparatus 1, the frictional surface at the time of engagement is formed inevitably by the surface of the metal external tooth plate 2 or internal tooth plate 3 and the surface of the lining 5. Consequently, the frictional heat is transmitted to and released from the external tooth plates 2 or the internal tooth plates 3 as shown by arrows in FIG. 2.

As described above, the internal tooth plate 3 is superior to the external tooth plate 2 in terms of the heat discharge. Thus, the internal tooth plates 3 are capable of releasing the frictional heat efficiently even if it is thin. On the other hand, the external tooth plate 2 is thicker than the internal tooth plate 3 and has a larger heat capacity. Thus, the external tooth plate 2 is excellent in heat absorption of the frictional heat and is capable of lowering a temperature of the frictional surface, thereby improving the heat resistance.

A frictional heat resistance test was conducted to testify advantageous effects by the improvement of the heat resistance as described above, while comparing the present embodiment of the apparatus 1 with a conventional multi-plate frictional engagement apparatus. In the conventional multi-plate frictional engagement apparatus, external tooth plates and internal tooth plates have the same thickness. Three kinds of the conventional multi-plate frictional engagement apparatuses are prepared as the conventional or comparative examples (indicated in TABLE 1 just as "CE") having the same thickness of the external tooth plates (indicated in TABLE 1 just as "ETP") and the internal tooth plates (indicated in TABLE 1 just as "ITP"). Three kinds of the multi-plate frictional engagement apparatuses 1 are also prepared as the present embodiment examples (indicated in TABLE 1 just as "Ex.") in which the thickness of the external tooth plates 2 is larger than that of the internal tooth plates 3. Then, the test was conducted on each of the three comparative examples and three of the present embodiment examples. A specification in each of the examples is shown in TABLE 1.

TABLE 1

| | Specification in Evaluation | | | | | |
|---|---|---|---|---|---|---|
| | Thickness of ITP & ETP | Thickness of ITP (mm) | Thickness of ETP (mm) | Thickness of Lining (mm) | Pack Amount (mm) | Endurance Cycle |
| 1st CE | ITP = ETP | 1.2 | 1.2 | 0.5 | 11.4 | 450 |
| 2nd CE | | 1.4 | 1.4 | 0.5 | 12.8 | 900 |
| 3rd CE | | 1.6 | 1.6 | 0.5 | 14.2 | 2300 |
| 1st Ex. | ITP < ETP | 1.2 | 1.4 | 0.5 | 12.2 | 1000 |
| 2nd Ex. | | 1.2 | 1.6 | 0.5 | 13.0 | 1700 |
| 3rd Ex. | | 1.2 | 1.8 | 0.5 | 13.8 | 3600 |

As shown in TABLE 1, the external tooth plate and the internal tooth plate have a same thickness of 1.2 mm in the first comparative example as prior art. The external tooth plate and the internal tooth plate have a same thickness of 1.4 mm in the second comparative example as prior art. The external tooth plate and the internal tooth plate have a same thickness of 1.6 mm in the third comparative example as prior art. In contrast, each of the internal tooth plates 3 has a same thickness of 1.2 mm in the first to the third examples according to the present embodiment. The external tooth plate 2 has a thickness of 1.4 mm in the first example, 1.6 mm in the second example and 1.8 mm in the third example according to the present embodiment. Thus, in each of the examples according to the present embodiment, the thickness of the external tooth plate 2 is larger than the thickness of the internal tooth plate 3.

In the case of the first to the third examples of the multi-plate frictional engagement apparatus 1, the thickness of the external tooth plate 2 is within a range of 1.4 mm to 1.8 mm, while the thickness of the internal tooth plate 3 being set within a range of about 65% to about 85% of the thickness of the external tooth plate 2. That is, in case of the first example, the thickness of the external tooth plate 2 is 1.4 mm (the smallest) and the thickness of the internal tooth plate 3 is about 85% (1.2 mm and 86% more precisely) of the external tooth plate 2. In case of the second example, the thickness of the external tooth plate 2 is 1.6 mm (middle value) and the thickness of the internal tooth plate 3 is about 75% (1.2 mm) of the external tooth plate 2. In case of the third example, the thickness of the external tooth plate 2 is 1.8 mm (the largest) and the thickness of the internal tooth plate 3 is about 65% (1.2 mm and 67% more precisely) of the external tooth plate 2.

A thickness of the lining 5 is all set to the same or 0.5 mm in each of the external tooth plates and the internal tooth plates of the first to the third comparative examples as prior art and the first to the third examples according to the present embodiment. Moreover, a thickness of the flange 4 is set to the same thickness as the external tooth plate in each of the first to the third comparative examples as prior art and the first to the third examples according to the present embodiment. Then, the pack amount is a value summing up all these thicknesses: total thicknesses of the three external tooth plates 2, the total thicknesses of the three internal tooth plates 3, total thicknesses of the six linings 5 and the thickness of the flange 4.

The test was conducted under a test condition: a relative rotation speed of 7500 rpm, an oil temperature of an automatic transmission fluid (may be referred to as "ATF") of 100° C., an ATF oil amount of 600 mL/min, a disc surface pressure of 0.8 MPa, an inertia of 0.12 kg·m2, a disc size of φ165 (outer diameter) and φ140 (inner diameter), and a number of frictional surfaces being set at six surfaces. Then, a number of cycles until a heat spot was generated was evaluated as an endurance cycle. Evaluation results are shown at a right end column in TABLE 1.

As shown in TABLE 1, if comparing the first example with the first comparative example, the first example performs an endurance cycle twice or more than that of the first comparative example, though the pack amount is not so different. Moreover, if comparing the second example with the second comparative example, the second example performs an endurance cycle nearly twice as many as that of the second comparative example, though the pack amount is nearly the same. Furthermore, if comparing the third example with the third comparative example, the third example performs an endurance cycle 1.5 times more than that of the third comparative example, though the pack amount in the third example is less than that of the third comparative example.

That is, if comparing the first to the third examples with the first to the third comparative examples, the endurance cycle of each of the first to the third examples exceeds to a large degree or becomes 1.5 to 2.0 times as large as the endurance cycle of each of the first to the third comparative examples, though pack amount is nearly the same. Consequently, it will be found that the first to the third examples of the multi-plate frictional engagement apparatus according to the present embodiment are hard to generate a heat spot, thereby improving the heat resistance to a large extent. Moreover, if comparing the first example with the second comparative example that are thought to have nearly the same heat resistance, the first example has a smaller pack amount.

As described above, the multi-plate frictional engagement apparatus 1 according to the present embodiment improves very much the heat resistance if the pack amount is the same in comparison with the conventional techniques. Moreover, the multi-plate frictional engagement apparatus 1 can afford to reduce the pack amount to a large degree if the same heat resistance is obtained or required.

FIG. 3 is a graph collecting up the results of the above frictional heat resistance test. In FIG. 3, a broken line shows a test result of the conventional multi-plate frictional engagement apparatus in which the external tooth plate and the internal tooth plate have the same thickness. A solid line in FIG. 3 shows a test result of the present embodiment of the multi-plate frictional engagement apparatus 1 in which the external tooth plate 2 is thicker than the internal tooth plate 3. It is confirmed from FIG. 3 that the endurance cycle is drastically improved as the pack amount increases in case of the present embodiment of the multi-plate frictional engagement apparatus 1 as compared with the multi-plate frictional engagement apparatus of the prior art.

As described above, the present embodiment of the multi-plate frictional engagement apparatus 1 makes the external tooth plates 2 thicker than the internal tooth plates 3. As a result, the multi-plate frictional engagement apparatus 1 increases sufficiently the heat capacity without any needs to add new steps and without any deterioration of the wear resistance of the lining, thereby improving largely the heat resistance thereof.

In the above embodiment, the multi-plate frictional engagement apparatus is the wet clutch 1 used in the automatic transmission of the automobile, for example However, the multi-plate frictional engagement apparatus is applicable to a wet brake or a lock-up clutch used for the automatic transmission of the automobile. Moreover, the invention is also applicable to a multi-plate frictional engagement apparatus used for a transmission device in an industrial machine or a building machine.

In the above embodiment of the multi-plate frictional engagement apparatus 1, the number of the external tooth plates 2 and the number of the internal tooth plates 3 are each three. However, the number of the external tooth plates 2 and the number of the internal tooth plates 3 are not limited to such number but may be any number as desired.

The invention is not limited to the present embodiment in constructions, shapes, numbers, materials, sizes, connecting relations and so on of the other parts of the multi-plate frictional engagement apparatus.

The preferred embodiments described herein are illustrative and not restrictive, the scope of the invention being indicated in the appended claims and all variations which come within the meaning of the claims are intended to be embraced therein.

The invention claimed is:

1. A multi-plate frictional engagement apparatus, comprising:
    a plurality of metal external tooth plates;
    a plurality of metal internal tooth plates arranged side by side to the external tooth plates, the internal tooth plates being rotated even at a non-engagement time;
    lining adhered to only one surface of each of the external tooth plates and to only one surface of each of the internal tooth plates, respectively, the lining being cut out from a wet friction material substrate;
    wherein a thickness of the internal tooth plate is set smaller than a thickness of the external tooth plate; and
    wherein the internal tooth plate having the smaller thickness constitutes heat discharge means for discharging heat, while normally rotating at all times and discharging the heat by a lubricant oil.

2. A multi-plate frictional engagement apparatus according to claim 1, in which the thickness of the internal tooth plate is within a range of 60% to 80% of the thickness of the external tooth plate.

3. A multi-plate frictional engagement apparatus according to claim 1, in which the thickness of the internal tooth plate is within a range of 0.8 mm to 2.0 mm, while the thickness of the external tooth plate being within a range of 1.0 mm to 2.4 mm.

4. A multi-plate frictional engagement apparatus according to claim 1, in which the thickness of the internal tooth plate is within a range of 0.8 mm to 2.0 mm, while the thickness of the internal tooth plate being set within a range of 50% to 90% of the thickness of the external tooth plate.

5. A multi-plate frictional engagement apparatus according to claim 1, in which the thickness of the internal tooth plate is within a range of 0.8 mm to 2.0 mm, while the thickness of the internal tooth plate being set within a range of 60% to 80% of the thickness of the external tooth plate.

6. A multi-plate frictional engagement apparatus according to claim 1, in which the thickness of the external tooth plate is within a range of 1.4 mm to 1.8 mm, while the thickness of the internal tooth plate being set within a range of about 65% to about 85% of the thickness of the external tooth plate.

7. A multi-plate frictional engagement apparatus according to claim 1, in which the thickness of all the internal tooth plates is set at a same thickness, while the thickness of all the external tooth plates being set at a same thickness.

8. A multi-plate frictional engagement apparatus, comprising:
- a plurality of metal external tooth plates;
- a plurality of metal internal tooth plates arranged side by side to the external tooth plates, the internal tooth plates being rotated even at a non-engagement time; and
- lining adhered to only one surface of each of the external tooth plates and to only one surface of each of the internal tooth plates, respectively, the lining being cut out from a wet friction material substrate;

wherein a thickness of the internal tooth plate is set smaller than a thickness of the external tooth plates, wherein the internal tooth plate having the smaller thickness constitutes heat discharge means for discharging heat, while normally rotating at all times and discharging the heat by a lubricant oil, and wherein the thickness of the internal tooth plate is within a range of 50% to 90% of the thickness of the external tooth plate.

* * * * *